United States Patent Office 3,312,611
Patented Apr. 4, 1967

3,312,611
IRRADIATION POLYMERIZATION OF TRIOXANE
Nelson S. Marans, Silver Spring, and Forrest A. Wessells, Baltimore, Md., assignors to W. R. Grace & Co., New York, N.Y., a corporation of Connecticut
No Drawing. Filed June 14, 1963, Ser. No. 287,768
6 Claims. (Cl. 204—159.21)

The present invention relates to the production of polyoxymethylene, and more specifically to a novel polymerization method by which good yields of particulate high molecular weight polyoxymethylene may be directly obtained from fine size particulate trioxane by irradiation means.

When trioxane is irradiated with high energy ionizing radiation in the solid state and subsequently heated to a temperature of from about 30 to 62° C. a polyoxymethylene is obtained which possesses a unique fibrous structure. This highly fibrous polyoxymethylene may be ground to obtain a fine size fibrous material having a major dimension of less than about 50 microns and a length to diameter ratio greater than about 10 to 1. This fine size material finds numerous applications as thickening agents for organic resins, insecticides, suspending agents, and so forth.

To obtain good yields of polyoxymethylene by way of irradiation polymerization of trioxane, it is heretofore been believed that trioxane crystals of relatively large dimensions must be used in the polymerization process. The use of large particle trioxane results in the obtaining of larger fibrous polymer particles. These large polymer particles are quite tough and considerable mechanical energy is required for their disintegration before the polymer can be used for the above mentioned applications. Previous attempts to reduce the particle size of trioxane prior to polymerization have resulted in decreased polymer yields.

It is therefore an object of the present invention to provide an improved method for producing fine size fibrous polyoxymethylene by irradiation means.

It is another object to provide a method by which fine size particulate trioxane may be efficiently polymerized by irradiation with high energy ionizing irradiation.

It is a further object to provide fine size fibrous polyoxymethylene which is particularly suitable for further grinding by direct irradiation polymerization of fine size particulate trioxane.

These and still further objects of the present invention will become readily apparent to one skilled in the art through the following detailed description and specific examples.

Broadly, the present invention contemplates an improved method for polymerizing fine size particulate trioxane which comprises irradiating a particulate trioxane having a particle size of less than about 1000 microns at a temperature of from about 50 to about 56° C., then holding the irradiated trioxane at a temperature of from about 50 to about 62° C. to obtain polymerization.

More specifically, we have found that if a fine size particulate trioxane having a particle size of less than about 1000 microns is first heated to a temperature of from about 50 to about 56° C. before irradiation with high energy ionizing irradiation, a substantially improved yield of polyoxymethylene polymer will be obtained. As will be shown hereinafter, the present invention yields a means by which the yield of polyoxymethylene obtained from fine size particulate trioxane will equal those heretofore only obtained using large size particulate monomer. The fine size monomer particles obtained in the present invention require considerable less grinding effort to obtain the extremely fine fibrous polyoxymethylene product which finds numerous useful applications.

The trioxane used in the practice of the present invention may be of the ordinary commercial grade which contains below about 0.02% moisture. In preparing the fine size particles used in the present invention any suitable grinding means may be used. For example, the commercial trioxane may be ground in high speed rotary grinders such as the commercially available Osterizer or the trioxane may be ground in a conventional low speed ball mill. In any event the particle size of the trioxane is preferably reduced to below about 1000 microns. The trioxane itself may be ground to this particle size with relatively small mechanical effort.

While it is desired to reduce the particle size of all of the trioxane used in the present process to below about 1000 microns when the ultimate use is for the preparation of fine size fibrous polyoxymethylene thickening agents and so forth, it should be understood that the presence of some larger particles in no way decreases from the efficiency of the present polymerization. The present invention is specifically directed to a means for more efficiently polymerizing fine size particles below the 1000 micron range which cannot ordinarily be effectively polymerized by prior art processes. Any larger particulate material will of course be effectively polymerized along with the smaller size particles, however, the presence of the larger particles renders subsequent grinding and size reduction more difficult than if the particles were all reduced below the 1000 micron size. Therefore it is seen the present invention is directed to an improved polymerization method for polymerizing particulate trioxane which falls below the 1000 micron range. However, it is not necessary in all the trioxane particles being polymerized to fall below this particular size.

Before the fine size particulate trioxane is subjected to high energy ionizing irradiation which initiates polymerization in the trioxane it is heated to a temperature of from about 50 to 56° C. This temperature range is found to be particularly critical when 420 microns and less size trioxane particles are polymerized. Increasing or lowering the temperature below this range, markedly decreases the yield of polymer obtained. The criticality of this irradiation temperature range is further appreciated when it is observed that if large size particulate trioxane, that is particulate trioxane having a minimum diameter of above about 1000 microns, is irradiated, the irradiation temperature is non-critical so long as it remains below the melting point of the trioxane monomer. In other words, large size particulate trioxane may be irradiated at any temperature below about 62° C. and no temperature falling in that range results in an increased yield of polymer.

Trioxane has a considerable vapor pressure in the temperature range of from about 50 to about 56° C. Therefore if the irradiation is conducted in the open atmosphere it is desired that the irradiation be conducted as quickly as possible so as to minimize trioxane loss through vaporization.

Ionizing irradiation which may be used in the practice of the present invention may be high energy electrons such as obtained from a Van de Graaff electron accelerator, or positive ions such as protons. Alpha particles, deuterons, and neutrons may also be used. Effective irradiation may also be supplied from radioactive isotopes or an atomic pile which would include X-rays and gamma rays.

The amount of high energy ionizing irradiation which is employed during the irradiation step may vary between 0.001 and 10 megarads. Preferably, however, radiation doses of less than about 5 megarads are generally preferred. Lower radiation dosages in the range from 0.02 to about 1.0 megarad may frequently be used with excellent economic advantage in that they decrease the cost of the irradiation apparatus which must be provided, and also it is found that the lower dosages do not result in undue heating of the crystalline trioxane monomer.

Preferably, the ionizing irradiation is delivered at a dose rate which does not produce a temperature rise within the trioxane monomer of more than about 2° C. Raising the temperature above this amount decreases the effectiveness of the aforementioned 50–56° C. irradiation temperature range which is found to be critical to the practice of the present invention.

Subsequent to irradiation the irradiated trioxane monomer is held at a temperature above about 30° C. and preferably within a temperature range of from about 50–62° C. (which is a temperature range just below the melting point of the trioxane monomer) to permit polymerization to take place. To minimize the possibility of oxidation occurring at the polymerization sites of the irradiated monomer, the irradiation and aging, i.e. polymerization, of the trioxane may be carried out in an inert atmosphere which may be provided by an inert gas or vacuum. However, it is generally found that satisfactory results may be obtained by carrying out the process in air.

The aging, i.e. polymerization of the trioxane at the above temperature range is conducted for a period of from about 0.5 to about 100 hours. Within this time it is found that polyoxymethylene yields in the order of 50% may be readily obtained. These yields compare favorably with those obtained for large particle size trioxane monomer.

Subsequent to polymerization the nonpolymerized trioxane may be removed from the polymer by extracting the polymerized mass with a solvent for the nonpolymerized trioxane such as water, methanol, methylene chloride or acetone. Alternatively the trioxane may be removed by evaporating the trioxane from the reaction mass at room temperature or elevated temperature with or without use of reduced pressure. Removal of the trioxane by evaporation permits the unreacted trioxane to be collected and recycled in the process without intermediate drying or other purification steps.

The polymers obtained by the present invention possess a unique fibrous structure. When the fibers are examined by conventional X-ray diffraction means it is found the polymer possesses a repeating identity period of 14 A. along the fiber axis. The melting point to the polymers ranges from about 185 to about 200° C. The reduced specific viscosities (RSV) which indicates molecular weight of the polymer as determined at 135° C. using 0.1 gram of polymer/100 milliliters of gamma butyrolactone vary from about 0.3 to about 3.0 deciliters per gram.

As indicated above this unique fibrous product as it is removed from the polymerization method possesses a particle size of below about 1000 microns. This fine size fibrous material may be quickly and easily ground by conventional means such as a fluid energy mill to provide an extremely fine fibrous material which finds numerous industrial applications.

Having described the broad aspects of the present invention the following detailed specific examples are given to illustrate embodiments thereof.

*Example I*

Commercial grade trioxane was ground in a Wiley mill to pass through a 20 mesh screen (this indicates a maximum particle size of less than 840 microns). This actual distribution of the particle size was determined to be as follows:

| Microns: | Percent |
|---|---|
| 500–840 | 45.5 |
| 350–500 | 36.2 |
| 250–350 | 13.2 |
| Less than 250 | 5.1 |

Samples of the original above material weighing 160 grams each were then irradiated at various temperatures and aged in 250 cc. bottles for 4 hours at 55° C. after irradiation. The irradiation used was high energy electrons having an energy of 2 mev. as delivered from a Van de Graaff accelerator. (The irradiation dose was delivered over a 1 second irradiation time which produced a maximum increase of 2° C. in the trioxane sample.)

The following table shows the improvement of conversion as a function of irradiation temperature.

| Irradiation Temp. (° C.) | Irradiation Dose (MR) | Conversion (percent) |
|---|---|---|
| 25 | 0.5 | 16.3 |
| 45.5 | 0.5 | 33.6 |
| 53.5 | 0.5 | 57.2 |

The above table indicates that the 53.5° irradiation run produced more than 20% increase in conversion as compared with the 45.5° temperature run. Large particle trioxane, that is trioxane having a particle size of greater than about 840 microns when polymerized under the above conditions resulted in consistent 50% conversion yield regardless of temperature at the time of irradiation.

*Example II*

Commercial grade trioxane was ground in an Osterizer and then sieved to obtain two fractions having two particle ranges. One fraction comprised particles having sizes less than 420 microns and another having a particle size range of 420 to 840 microns. These samples of monomer were placed in sealed aluminum cups and irradiated at a series of irradiation temperatures. Each sample was given an irradiation dosage of 0.5 megarad in a one second irradiation pass, then aged for varying periods at 55° C. The following tables summarize the data obtained.

| Particle Size (microns) | Aging Time (hr.) | Percent Conversion at Irradiation Temp. | | |
|---|---|---|---|---|
| | | 22° C. | 52° C. | 54.5° C. |
| <420 | 0.03 | | 14.4 | 15.8 |
| <420 | 0.50 | | 29.8 | 27.6 |
| <420 | 1.0 | | 34.1 | 30.4 |
| <420 | 2.0 | | 41.0 | 35.6 |
| <420 | 4.0 | 39.5 | 48.4 | 42.0 |
| 420–840 | 0.03 | | 13.5 | 15.5 |
| 420–840 | 0.5 | 25.8 | 31.6 | 29.2 |
| 420–840 | 1.0 | 31.4 | 37.8 | 33.4 |
| 420–840 | 2.0 | 41.2 | 45.2 | 40.8 |
| 420–840 | 4.0 | 47.1 | 53 | 48.0 |

From the above data it is seen that the 52° C. irradiation temperature produces a considerably better conversion than either the 22° or 54.5° C. irradiation temperature. It is also observed that as the particle size increases the criticality of the 52° C. irradiation temperature decreases. Furthermore, when the particle size range is increased to above about 1000 microns it is found the 52° C. irradiation temperature is not at all critical, and substantially the same percent conversion is obtained at all irradiation temperatures.

*Example III*

To further show the criticality of the present 50–56° C. irradiation temperature range on fine sized particulate trioxane, a series of 40 mesh (less than 420 microns) samples were irradiated at 1° C. temperature intervals. All samples were irradiated as set forth in Example II, and aged 4 hours at 55° C. The results are tabulated below:

| Irradiated temp., °C.: | Conversion, percent |
|---|---|
| 50 | 38.2 |
| 51 | 39.5 |
| 52 | 43.9 |
| 53 | 47.1 |
| 54 | 45.0 |
| 55 | 41.6 |
| 56 | 42.2 |
| 57 | 36.5 |

The preceding specific examples clearly indicate that by using an irradiation temperature of from about 50–56° C. high yields of polyoxymethylene polymer may be obtained from an extremely fine size particulate trioxane monomer. These yields approach those heretofore obtained using large size particulate monomer.

The fine sized particulate polymers may be easily ground to obtain a fibrous material which finds numerous commercial applications. Furthermore the presently obtained fine sized polymers may be readily stabilized due to its large surface area to volume which permits rapid solution and melting in a liquid state stabilization system. In a solid state stabilization system, the large surface area of the polymer permits rapid absorption of the stabilizer reagents. It is also found that the small particle size of the present polymerized material permits rapid and efficient removal of the non-polymerized trioxane.

We claim:

1. An improved method for providing a fine size fibrous polyoxymethylene having a major dimension of less than about 50 microns and a length to diameter ratio of greater than about 10:1 which comprises heating a particulate trioxane having a miximum particle size of less than about 420 microns to a temperature of from about 50 to about 56° C., irradiating said trioxane with high energy ionizing irradiation to initiate polymerization thereof, aging said irradiated trioxane at a temperature of about 50 to about 62° C. to cause polymerization thereof, recovering polyoxymethylene formed during said polymerization, and grinding said recovered polyoxymethylene to obtain fibrous particles of said dimensions.

2. The method of claim 1 wherein from about 0.02 to about 10.0 megarads of high energy ionizing radiation is imparted to said trioxane.

3. The method of claim 2 wherein said irradiation is delivered at a dose rate so as to impart a temperature range of not more than about 2° C. to said trioxane.

4. The method of claim 2 wherein the high energy ionizing irradiation is electrons having an energy of from about 0.01 to about 2 mev.

5. The method of claim 1 wherein said irradiated trioxane is aged for from about 0.5 to about 100 hours.

6. The method of claim 1 wherein said recovery of trioxane is achieved by extracting nonpolymerized trioxane with water.

References Cited by the Examiner

UNITED STATES PATENTS

| 2,921,006 | 1/1960 | Schmitz et al. | 204—154 |
| 2,947,728 | 8/1960 | Bartz | 260—67 |
| 3,103,499 | 9/1963 | Dolce et al. | 260—67 |
| 3,107,208 | 10/1963 | Chachaty | 260—154 |

OTHER REFERENCES

Charlesby: Radiation Effects on Materials, p. 382, Pergamon Press, New York, 1960.

Fadner et al.: Polymerization of the Crystalline State, Journal of Polymer Science, vol. 45, pages 475–501 (1960).

Okamura et al.: Radiation Induced Polymerization of Trioxane; Isotopes and Radiation, vol. 3, No. 5 (1960), pp. 417–418.

Okamura et al.: Cationic Polymerization of Trioxane in Solid Phase, Journal of Polymer Science, vol. 45, pages 475–501 (1960).

Hayashi et al.: Kinetics of Radiation Induced Solid State Polymerization of Cyclic Monomers, Die Makromole Chemie, vol. 47, pp. 230–240, July 1961.

SAMUEL H. BLECH, *Primary Examiner.*

MURRAY TILLMAN, *Examiner.*

NORMAN OBLON, R. B. TURER, *Assistant Examiners.*